United States Patent [19]

Seth

[11] 4,013,780

[45] Mar. 22, 1977

[54] RECOVERY OF IODINE FROM BRINE WITH LINEAR ALKYL BENZENE SOLVENTS

[75] Inventor: Kishan K. Seth, Baton Rouge, La.

[73] Assignee: Ethyl Corporation, Richmond, Va.

[22] Filed: Nov. 17, 1975

[21] Appl. No.: 632,199

[52] U.S. Cl. .................................. 423/501
[51] Int. Cl.$^2$ ............................. C01B 7/14
[58] Field of Search ............... 210/22; 423/501

[56] References Cited

UNITED STATES PATENTS

| | | | |
|---|---|---|---|
| 1,380,851 | 6/1921 | Tobler | 423/501 |
| 3,107,154 | 10/1963 | Schachter et al. | 423/501 |

FOREIGN PATENTS OR APPLICATIONS

| | | | |
|---|---|---|---|
| 3,681 | 10/1975 | Britain | 423/501 |

OTHER PUBLICATIONS

Kirk-Othmer *Encyclopedia of Chemical Technology,* 2nd edition, Interscience, New York vol. 8 (1965), pp. 719, 720 vol. 11 (1966), pp. 850–852.

Primary Examiner—Edward J. Meros
Assistant Examiner—Brian E. Hearn
Attorney, Agent, or Firm—Donald L. Johnson, John F. Sieberth, James M. Pelton

[57] ABSTRACT

A process for the recovery of iodine from aqueous brine by extracting with organic solvents and recovery of the iodine from the solvent, preferably the brine is oxidized prior to extraction according to conventional procedures.

14 Claims, No Drawings

RECOVERY OF IODINE FROM BRINE WITH LINEAR ALKYL BENZENE SOLVENTS

BACKGROUND OF THE INVENTION

Iodine finds use in the photographic industry, principally as potassium iodide, and animal feeds, as well as in pharmaceutical preparations, dyes and iodized salts. In recent times, the use of iodine as a disinfectant and antiseptic has been recognized as having major advantages over chlorine because of longer life, lack of odor, lack of bleaching and minimal eye irritation. Radioactive iodine has been utilized successfully for the treatment of cancer of the thyroid and organic iodine compounds have been employed as X-ray contrast media. Industrial use of iodine, in addition to photography, includes the use of iodine and certain iodides as catalysts in many reactions, for example, titanium tetraiodide is employed for producing stereo specific polymers, such as polybutadiene rubber, and free iodine is a catalyst in the manufacture of thiophenol. Also, silver iodide smoke has been employed for seeding clouds to induce rainfall. Further, iodine can be utilized in the treatment of naphtha to yield a motor fuel with an improved octane number. Finally, iodine and its complexes and compounds find wide-spread use as chemical intermediates.

Although, iodine was discovered about 1811 by Courtois, the first publication treating iodine was made by Gay-Lussac in about 1814. Since that time, commercial production of iodine has suffered from numerous disadvantages. In spite of the presence of vast amounts of iodine in seawater, the concentration is less than 0.1 part per million. It is known, however, that some forms of marine life extract and concentrate iodine from seawater. Thus, iodine was first commercially produced from seaweed by treating seaweed ashes with sulfuric acid and manganese dioxide or other oxidizing agents to liberate the free element. Subsequent discovery of iodine in Chilean nitrate beds containing 0.05 to 0.1 weight percent iodine as iodates of sodium and calcium led to development of a process involving treating the iodates with sulfuric acid to yield iodic acid which was reduced with sulfuric acid followed by purifying the resulting iodine by by sublimation.

Iodine is the least abundant of the halogens and the most difficult to recover because of its low concentration. As indicated above, the concentration of iodine is so low that direct treatment of seawater for iodine recovery would be very costly and hence uneconomical. Modern production of iodine followed the discovery of attractive quantities of iodine in Louisiana oil well brines. Subsequently, oil well brines in California and natural brines in Michigan containing 30 to 40 parts per million of iodine were discovered and treated according to the so-called "blowing-out" process. According to this process, the brine is acidified and treated with a slight excess of chlorine to liberate free iodine from the iodide. The iodine-containing brine is than pumped to a stripping tower in which air is passed countercurrent to the brine, stripping out the iodine. The iodine-laden air passes into a second tower where the iodine is chemically absorbed into an aqueous solution of sulfur dioxide, hydriodic and sulfuric acids. After treatment with additional sulfur dioxide to insure that all of the iodine is reduced to hydriodic acid, a part of the solution is drawn off to a reactor for recovery of iodine and the remainder is recirculated to the absorption tower for absorption of more free iodine from the air stream. The hydriodic acid solution drawn off is treated for recovery of iodine by reaction with chlorine to liberate the iodine and the liberated iodine is settled, filtered, and melted in a kettle under concentrated sulfuric acid and cast into ingots which are then cooled, crushed and packaged and sold at purity of 99.8 percent by weight. More stringent purity requirements of certain pharmaceutical applications are met by subliming the crude iodine.

In spite of the commercial success of the blowing-out process, the industry has always needed a process which eliminates many of the disadvantages of the blowing-out process, for example, large amounts of acid are required with the attendant need for corrosion resistant equipment made from expensive materials of construction. The use of hydriodic and sulfuric acid in the absorption tower is very corrosive for equipment, piping, tanks, etc. Further, processes which offer improved yields, lower operating cost or lower initial capital investment would be extremely advantageous for present producers or new entrants into the iodine industry. Yet another disadvantage of the blowing-out process is the requirement for large amounts of air with its associated compression and pumping energy costs. Still further, the requirement for large brine collection systems dictates the need for a central location of a blowing-out process plant. In the process of the present invention, there is provided a more economical process for the recovery of iodine from brines with respect to both capital investment and operating cost. In view of the lowered operating cost, raw materials needs and investment cost, it may be possible to employ centralized plants for extraction of iodine from brines followed by transfer of the extracted iodine in more concentrated form to a central recovery and purification plant. Accordingly, the present invention has numerous advantages over conventional processes for recovery of iodine from oil well or other brines.

THE INVENTION

In accordance with the present invention, there is provided a process for extracting free iodine from brine comprising contacting said free iodine-containing brine with an organic solvent substantially inert to said iodine and substantially insoluble in said brine, said solvent being normally liquid at room temperature and having an extraction distribution coefficient of at least 10, at a solvent to brine ratio of from about 1:10 to about 1:100 parts per part by weight. Preferably, the brine is an oxidized brine from acidification and oxidation, for example by chlorination, according to known techniques employed in conventional processes. Thus, a preferred embodiment of the present invention is provided by the foregoing process which is further characterized in that prior to contacting the brine with organic solvent, the brine is oxidized with chlorine at 1 to about 40 weight percent excess over the theoretical amount required to convert the iodide contained in the brine to free iodine.

With respect to the iodine content, oil field brines can vary depending on location and strata. In many instances, the iodine content provides a convenient and rapid means for identifying the zone from which the brine is being produced in a known field. Brines in the Shreveport, Louisiana area are known which contain about 35 parts per million of iodine; California oil field brines from the Venice area or Long Beach area contain from 10 to 135 parts per million iodine. Other brines, such as Michigan natural brines, contain from 30 to 40 parts per million iodine. Oklahoma brines contail from 20 to 500 parts per million and, preferably, from about 200 to 400 parts per million of iodine. A suitable brine which is amenable for processing according to the present invention has a typical analysis as set forth in the table below:

Typical Brine Analysis

| Component/Property | Value |
| --- | --- |
| $I^-$ | 323 mg/l |
| $Br^-$ | 124 mg/l |
| $Cl^-$ | 8,355 mg/l |
| $IO_3^-$ | <5 mg/l |
| $OH^-$ | <2 mg/l |
| $CO_3^{+2}$ | <3 mg/l |
| $SO_4^{-2}$ | 97 mg/l |
| $H_2S$ | <0.01 mg/l |
| $NH_4$ | 38 mg/l |
| Organic Carbon | 625 mg/l |
| Total Dissolved Solids | 1.5% |
| pH | 7.1 |

In general, the process for recovery of iodine from brine includes the steps of cleaning up the brine to remove oil and other suspended materials, for example, by means of clarifier tanks, then acidifying the brine with sulfuric acid or hydrochloric acid. Although, generally speaking, any inorganic mineral acid can be used, hydrochloric acid is preferred where the brine contains appreciable quantities of barium, which is precipitated as barium sulfate if sulfuric acid is used, and then requires a separate filtration step. Thus, hydrochloric acid acidification provides an acid brine which is suitable for processing in the present invention. Where the barium content is low, sulfuric acid can be used with equal ease and is preferred because of cost and corrosion problems. In treating a brine having a typical analysis as given in the above table according to the process of the present invention, the low amount of or lack of barium ions render precipitation with sulfuric acid unnecessary. It is preferred in the present process to employ hydrochloric acid to acidify the brine because of the subsequent oxidation with chlorine. Preferably, the brine is acidified from a pH of about 7 or slightly higher to a pH of 1 to about 5, preferably a pH of 2 to 3.

After clarification and acidification of the brine, the brine can be oxidized according to known methods employed in conventional processes. Thus, any material which converts iodide to free iodine, such as fluorine, chlorine, bromine, oxygen, hydrogen peroxide, etc., and preferably chlorine, can be used. Chlorine is preferred because of its ready availability and its relatively low cost. Oxidation can be conducted according to known conditions in the conventional prior art processes. According to such processes, the clarified and acidified brine has chlorine gas or chlorine water injected, while the brine is in transit to a subsequent step, in amounts somewhat in excess of the theoretical ratio of 0.28 pound of chlorine per pound of iodine. Although the theoretical amount of chlorine gas or the equivalent as chlorine water can be used to oxidize iodide to free iodine, it is more practical to use an excess of chlorine. In particular, in the process of the present invention, it has been found that a particularly suitable oxidized brine for use in the process of the present invention is characterized in that said brine is oxidized with chlorine at 1 to about 40 weight percent in excess over the theoretical amount required to convert the iodide contained in the brine to free iodine.

Depending on the contact time employed, variation in the excess over the theoretical amount of chlorine will result in different efficiencies of converting iodide to iodine. Also, for a given temperature and starting pH of the acidified brine, recovery of iodine will be higher or lower depending on the conditions of the oxidation step. The shorter the contact time, the greater the excess of chlorine required to convert iodide to free iodine, and, conversely, the longer the contact time the closer to the theoretical amount of chlorine that can be used with good conversion of iodide to iodine. For reasons of practicality and economy, the excess of chlorine should be kept as low as possible to obtain high conversions of iodide to iodine. Also, the contact time should be kept as short as practical to avoid hydrolysis of the free iodine produced to even more difficultly recoverable iodates. As the temperature is increased, the rate of the competitive hydrolysis reaction is also increased. Thus, a preferred embodiment of the oxidation of brine to convert iodide contained in the brine to free iodine employs 1 to about 10 weight percent excess chlorine over the theoretical amount.

The following table shows the effect of excess chlorine on conversion of iodide to free iodine. Using 1.5 weight percent sodium chloride brine solution containing an initial 340 parts per million of iodide at a pH of 2.6 and a temperature of 65° C., brine was contacted with various amounts of chlorine from the theoretical amount to 20 percent excess during different periods of time and the weight percent of iodide converted to free iodine was determined. The results of this study are given below:

Oxidation of $I^-$ to $I_2$ In Brine With $Cl_2$

| Contact Time, Min. | Conversion, Wt. % | | | |
| --- | --- | --- | --- | --- |
| | Theoretical Chlorine | 5% Excess Chlorine | 10% Excess Chlorine | 20% Excess Chlorine |
| 1 | 80.5 | 84.4 | 83.8 | 85.0 |
| 2 | 81.7 | 85.8 | 85.8 | 87.2 |
| 3 | 83.5 | 86.9 | 87.5 | 90.7 |
| 5 | 81.7 | — | — | — |

At a pH of 2.1, conversion of iodide to free iodine of 93 percent was obtained in two minutes using 10 percent excess chlorine. Accordingly, the effect of pH on conversion of iodide to iodine is that at lower pH less chlorine is required.

As previously indicated, temperature has an affect on the competitive hydrolysis reaction. Therefore, the temperature of the brine is an important consideration. The oxidation of brine can be carried out at a temperature which gives good liberation of iodine from iodide. Temperatures from about 25 to about 100° C. can be used. From the standpoint of lowering process cost and capital investment, it is desirable to operate the process of the present invention so that heating and cooling the brine are not required. Thus, the brine oxidation can be carried out at well head temperatures, so long as such temperatures are not so low as to give impractically slow reactions or so high as to favor competitive reactions, e.g., the hydrolysis of iodine to iodide ion. Preferably, the conversion of iodide to iodine in the oxidation of brine is conducted at a temperature of from about 25 to about 80° C., and more preferably at from about 50 to about 75° C., but most preferably at the well head temperature within those ranges so that additional brine heating and/or cooling steps are not additionally required.

The oxidized brine is then contacted with an organic solvent to extract the free iodine from the oxidized brine. The properties of the organic solvent are important to the process of the present invention. In general, a suitable organic solvent can be broadly described as one having a high degree of solubility for iodine and low or negligible solubility for brine. Further, the organic solvent should be easy to separate from the brine and iodine. Solubility of the organic solvent in the brine should be less than 30 parts per million at room temperature, and, preferably, nil. Also, the high solubility of iodine in the solvent can be described as a function of its distribution coefficient or partition function. The distribution coefficient can be defined as the concentration of iodine in the solvent divided by the concentration of iodine in the aqueous phase or brine. Any organic solvent with a distribution coefficient greater than 1 would be considered effective to separate free iodine from the brine since it would be more soluble in the solvent than in the brine. However, a distribution coefficient of 50 to 1000 has been found to be extremely effective in extracting free iodine from brines. Preferably, the solvent should have a distribution coefficient of from about 200 to about 500.

Organic solvents having such distribution coefficients and solubility and separation characteristics so as to be particularly effective in the process of the present invention have been found to be hydrocarbon compounds, particularly paraffinic hydrocarbon compounds having from about 5 to about 16 carbon atoms. Further, aromatic hydrocarbons, particularly alkylated mononuclear aromatic hydrocarbon compounds, have also been found to be effective solvents in the process of the present invention. Therefore, it is preferred that the process of the present invention be conducted using an organic solvent which is an aliphatic hydrocarbon compound or mixture thereof having from about 5 to about 16 carbon atoms and, preferably, such aliphatic hydrocarbon compounds selected from paraffinic hydrocarbon compounds having from about 7 to about 9 carbon atoms. Typical of the aliphatic and paraffinic hydrocarbon compounds of the present invention are pentane, hexane, heptane, octane, nonane, decane, undecane, dodecane, tridecane, tetradecane, pentadecane and hexadecane, including all of their isomeric and branched forms. Exemplary of such isomeric and branched hydrocarbon compounds are neopentane, isopentane, dimethylbutane, methylpentane, dimethylheptane, dimethylhexane, dimethylpentane, diethylpentane, trimethylpentane, ethylpentane, methylhexane, ethylhexane, propylheptane, propyloctane, butylnonane, butyldecane, pentylundecane, their various positional isomers and the like. Also useful are various substituted hydrocarbons having a saturated aliphatic and, preferably, paraffinic carbon chains. For example, saturated alicyclic aliphatic compounds substituted with halogen, such as fluorine, chlorine, bromine or iodine atoms, or with nitro, amino, or other substituent groups which are substantially non-reactive with the brine or iodine can be used. Illustrative of such compounds are fluoropentane, chlorohexane, bromoheptane, nitrooctane, aminononane, difluorodecane, dibromoundecane, dichlorododecane, dinitrotridecane, diaminotetradecane, fluorochloropentadecane, chlorobromohexadecane, chloroaminopentane, chlorobromohexadecane, chloroaminopentane, bromonitroheptane, iodoaminooctane and the like in any combination and with any of the above described alkyl groups. Further, cyclic saturated aliphatic hydrocarbon compounds, both substituted with entities given above or unsubstituted, such as cyclohexane, cycloheptane, cyclododecane, cyclohexadecane and the like are suitable in the process of the present invention. One skilled in the art can visualize many possibilities of combinations not specifically enumerated herein which nevertheless will have the desired solubility for iodine, insolubility in brine, distribution coefficient and non-reactivity for use in the process of the present invention. Preferred are heptane, octane and nonane, of which octane is most preferred because of its low cost and ready availability.

Another preferred class of organic solvents suitable for the process of the present invention is an aromatic hydrocarbon or substituted aromatic hydrocarbon, such as mononuclear or dinuclear aromatic compounds and alkyl-substituted mononuclear and dinuclear aromatic hydrocarbon compounds. Especially preferred because of their low cost and effectiveness are benzenes and alkyl-substituted benzenes in which the alkyl group has from about 3 to 14 carbon atoms in the alkyl chain. Most preferred is a linear alkyl benzene compound or mixture of linear alkyl benzene compounds having one alkyl group attached to each benzene ring in which the alkyl group averages from 6 to about 12 carbon atoms.

In addition to the mononuclear aromatic compounds illustrated herein, suitable solvents for the process of this invention are condensed and separated dinuclear aromatic compounds, such as naphthalene, tetrahydronaphthalene, diphenylmethane, diphenylethane, diphenylpropane, cyclohexylbenzene, phenylbenzene and the like. Such dinuclear aromatic compounds can be likewise substituted with alkyl groups having 1 to about 4 carbon atoms, halogens, such as fluorine, chlorine, bromine and iodine, or nitrogen-containing groups, such as nitro, amino and the like, or other groups which do not affect the desired solubility, inertness and extractability characteristics of the solvent.

Another class of solvents preferred in operation of the present process are lower alkyl-substituted benzenes having from 1 to about 4 carbon atoms in the alkyl group. Typical of the aromatic and substituted aromatic hydrocarbon compounds which may be used as solvents in the present process are benzene, toluene, xylene, mesitylene and all of their various positional isomers, tetramethylbenzene, pentamethylbenzene, and hexamethylbenzene, ethylbenzene, ethylmethylbenzene, diethylbenzene, triethylbenzene, diethylmethylbenzene and diethyldimethylbenzene, propylbenzene, dipropylbenzene, tripropylbenzene, propylmethylbenzene, propylethylbenzene, dipropylmethylbenzene, dipropyldimethylbenzene and dipropyldiethylbenzene, butylbenzene, dibutylbenzene, tributylbenzene, butylmethylbenzene, butylethylbenzene, butylpropylbenzene, dibutylmethylbenzene, and the like.

Mixtures of the foregoing lower alkyl-substituted benzenes can also be employed. Further, there are a wide number of positional isomers as well as various combinations of methyl, ethyl, propyl, isopropyl, butyl and isobutyl radicals which may be substituted on benzene and in various proportions of mixtures of such substituted benzenes which are within the scope of the organic solvent useful in the present invention. Of the lower alkyl benzene solvents useful in the present invention, trimethylbenzene is preferred because of its high distribution coefficient and easy separation from the aqueous brine.

The linear alkyl benzene compounds useful in this invention are benzene compounds having a saturated straight chain or linear alkyl side chain of from about 6 to about 14 carbon atoms. Such compounds may be exemplified by hexylbenzene, heptylbenzene, octylbenzene, nonylbenzene, decylbenzene, undecylbenzene, dodecylbenzene, tridecylbenzene, tetradecylbenzene and may have from one to six linear alkyl side chains in any of their various positional isomers. Preferably, the linear alkyl benzene compounds of the present invention have one alkyl group attached to each benzene ring. The linear alkyl benzene preferably can be a mixture of benzene compounds having alkyl groups of various chain lengths attached to each benzene ring such that the average chain length of the alkyl groups is from about 8 to about 12 carbon atoms. Thus, preferred linear alkyl benzene compounds are those which have one alkyl group attached to the benzene ring and the alkyl group attached thereto averages from 10 to about 12 carbon atoms. Commercially available mixtures of such linear alkyl benzene compounds are preferred because of their low cost and high distribution coefficient and low solubility in brine.

In selecting a solvent, the method of recovery of iodine from the solvent should be considered. That is, the properties of the solvent should be such that recovery of the iodine from the solvent is efficient and convenient. For example, if distillation is employed to separate solvent and iodine, the boiling point of the organic solvent should be substantially different from that of iodine, which is about 185° C., so that clean and rapid distillation of solvent or iodine from one another can be accomplished. Of course, other methods of separation can be employed so that organic solvents having a boiling point close to that of iodine, but also having low water solubility and a high distribution coefficient, as well as other advantageous properties, can be employed in the process of the present invention. For example, such solvents may be separated from iodine by fractional crystallization or conversion of the free iodine to a more easily separable form.

The amount of organic solvent used in the process of this invention depends on the solubility of iodine in the solvent as well as the rate of dissolution of iodine in the solvent. For a solvent, as described above, having a distribution coefficient greater than 10 and, preferably in the range of 50–1000, extraction with 1 part by weight of solvent to about 10 to about 100 parts by weight of brine can efficiently remove free iodine from the brine. Preferably, a range of from 1 to about 20 to 1 to about 100 parts by weight of brine per part of solvent can be employed. The solvent and brine should be contacted efficiently using known methods of extraction, such as, countercurrent or concurrent flow techniques in packed beds. Agitated in-line mixers can be used to contact the brine and solvent efficiently. Using conventional equipment, 1 to 3 extraction stages can be employed to effectively extract free iodine from the oxidized brine using the process of the present invention. For more efficient extraction, a greater number of extraction stages can be used, but the solvent and brine are preferably contacted in three stages to effectively separate the iodine from the brine. Although greater than three stages can be used, such a process will have the disadvantage of increased processing cost and capital investment in equipment.

In general, the temperature of the extraction does not have a great affect on the present invention. This is in complete contrast to the conventional blowing-out process in which lower temperatures require a much greater amount of air to achieve the same yield as at higher temperatures. For example, at about 27° C., the same yield of air for stripping iodine from the brine as at about 65° C. However, in the present invention, the extraction of free iodine from the oxidized brine is not substantially affected by such differences in operating temperature. In fact, for some operations, in the process of the present invention, lower temperatures are preferred because they result in lower free iodine handling losses. Temperatures during extraction similar to that for oxidation of the brine can be employed. Thus, contacting can be accomplished at 25 to about 80° C. and preferably 50 to about 75° C. Well head temperatures can be used to avoid the necessity and equipment required for heating or cooling the brine which increases processing and capital investment costs.

The following examples illustrate the recovery of iodine from brine by extraction into organic solvents. The extraction and subsequent separation in each case was very satisfactory. In each example, all parts and percentages are by weight unless otherwise indicated.

EXAMPLE 1

In a sapratory funnel are placed 200 parts of brine solution containing 1.5% chloride as sodium chloride and 431 parts per million of iodine. The iodine containing brine was extracted three times with 10 parts each time of dodecane. This corresponds to a solvent to brine ratio of 1:20. On separation, there remained in the brine phase 17.9 parts per million of iodine after the extraction. This corresponds to an extraction efficiency of 95.85% iodine extracted.

EXAMPLE 2

Following a procedure similar to Example 1, 198.4 parts of 1.5% chlorine solution containing 397.3 parts per million of free iodine was extracted twice with 5 parts each time of phenylhexane. The aqueous phase remaining after extraction contained 25.2 parts per million of free iodine and the extraction efficiency was 93.67%.

EXAMPLE 3

Following a procedure similar to Example 1, 200 parts of 1.5% sodium chloride solution containing about 400 parts per million of free iodine was extracted once with 5 parts of cyclohexylbenzene. An additional 5 parts of cyclohexylbenzene were used to extract in a second stage. On analysis, there remained 14.9 parts per million of free iodine in the aqueous phase giving an extraction efficiency of 96.27%.

EXAMPLE 4

In a process similar to that of Example 1, 200 parts of 1.5% sodium chloride solution containing about 400 parts per million of free iodine was twice extracted with 5 parts each of diisopropylbenzene resulting in 3 parts per million of free iodine remaining in the aqueous brine phase for an extraction efficiency of 99.25%.

EXAMPLE 5

The process of Example 4 is repeated with 10 parts per million of iodine remaining in the aqueous brine after two-stage extraction with 5 parts each of diisopropylbenzene solvent. The extraction efficiency is 97.5%.

EXAMPLE 6

In a process similar to that of Example 1, 200 parts of 1.5% sodium chloride solution containing about 400 parts per million of free iodine was once extracted with 10 parts of trimethylbenzene resulting in 20 parts per million of free iodine remaining in the aqueous brine phase for an extraction efficiency of 95%.

EXAMPLE 7

In a process similar to that of Example 1, 200 parts of 1.5% sodium chloride solution containing about 400 parts per million of free iodine was extracted three times with 10 parts each time of normal octane resulting in 20 parts per million of free iodine remaining in the aqueous brine for an extraction efficiency of 95%.

EXAMPLE 8

In a process similar to that of Example 1, 200 parts of 1.5% sodium chloride solution containing about 80 parts per million of free iodine was once extracted with 2 parts of a linear alkyl benzene mixture in which the average chain length of the alkyl groups was 9 carbon atoms, resulting in 3 parts per million of free iodine remaining in the aqueous brine phase for an extraction efficiency of 96.2%.

The iodine contained in the solvent can be recovered from the solvent by conventional procedures used in the so-called blowing-out process, for example, the free iodine can be oxidized to iodide ions by reacting with sulfur dioxide and water, forming hydriodic acid. The organic solvent and aqueous phase are vigorously agitated and separated, followed by a second oxidation with chlorine to free iodine. In this case, however, the iodine is much more concentrated in the acid solution and can be crystallized and filtered therefrom, followed by casting into ingots, crushing the cast ingots and packaging for shipment. Such procedure will produce iodine having about 99% purity. For certain pharmaceutical applications, however, the high purity desired can be obtained by subliming the product.

Other procedures such as fractional crystallization or distillation can be employed. Distilliation of iodine from the organic solvent or of the organic solvent from iodine depends on the boiling point of the solvent as mentioned above. With solvents having a boiling point lower than iodine, the solvent is distilled off and the iodine concentrated as the bottom product. With high boiling solvents, the temperature is increased to the point at which iodine is vaporized, taken overhead, condensed and cast into ingots. Recovery of material having the purity of that from the conventional processes can be practically achieved.

Of course many solvents described above have boiling points close to that of iodine or for other reasons such as thermal degradation or reaction with iodine it is not desired to use distillation as a recovery method. In such cases, fractional or evaporative crystallization can be employed when the characteristics of the solvent admit of this method. Thus, the solution can be heated, perhaps under vacuum to drive off a portion of the solvent and then a controlled cooling will allow the precipitation of iodine from the solvent to the point where decantation and/or filtration can be used to recover iodine in good yield.

From the foregoing description, one skilled in the art can envision variations and departures from the present invention which should be considered within the scope and spirit of the present invention. Having described certain particular embodiments of the invention, it is desired that the invention be limited only by the scope of the following claims.

What is claimed is:

1. A process for extracting free iodine from brine comprising contacting said brine containing free iodine with an organic solvent substantially inert to said iodine and substantially insoluble in said brine, said solvent being a substituted aromatic hydrocarbon which is a linear alkyl benzene compound or mixture of linear alkyl benzene compounds having from about 6 to about 14 carbon atoms in the alkyl chains which is normally liquid at room temperature and having an extraction distribution coefficient of at least 10, at a solvent to brine ratio of from about 1:10 to about 1:100 parts per part by weight and recovering said free iodine from said solvent.

2. The process of claim 1 further characterized in that prior to said contacting, said brine is oxidized with chlorine at 1 to about 40 weight percent excess over the theoretical amount required to convert the iodide contained in said brine to free iodine.

3. The process of claim 1 further characterized in that prior to said contacting, said brine is oxidized with about 1 to about 10 weight percent excess chlorine over the theoretical amount required to convert the iodide contained in said brine to free iodine.

4. The process of claim 1 further characterized in that said solvent is a mixture of linear alkyl benzene compounds having one alkyl group attached to each benzene ring, said alkyl group averaging from about 8 to about 12 carbon atoms.

5. The process of claim 1 wherein said contacting is conducted in 1 to about 3 stages for extracting said iodine from said brine.

6. The process of claim 1 wherein said contacting is conducted in three stages to liberate said free iodine from said brine.

7. The process of claim 1 further characterized in that prior to said contacting, said brine is oxidized with chlorine at from about 1 to about 40 weight percent in excess of the theoretical amount required to convert the iodide contained in said brine to free iodine and said solvent is a mixture of linear alkyl benzene compounds having one alkyl group attached to each benzene ring, said alkyl group averaging from 10 to about 12 carbon atoms.

8. The process of claim 1 further characterized in that prior to said contacting, said brine is oxidized with chlorine at 1 to about 10 weight percent in excess of the theoretical amount required to convert the iodide contained in said brine to free iodine and said solvent is a linear alkyl benzene or mixture of linear alkyl benzene compounds in which the alkyl group has from about 6 to about 14 carbon atoms.

9. The process of claim 1 further characterized in that prior to said contacting, said brine is oxidized with chlorine at 1 to about 10 weight percent in excess of the theoretical amount required to convert the iodide contained in said brine to free iodine and said solvent is a mixture of linear alkyl benzene compounds having one alkyl group attached to each benzene ring, said alkyl group averaging from about 10 to about 12 carbon atoms.

10. The process of claim 1 wherein said brine is at a temperature of about 25 to about 80° C.

11. The process of claim 1 wherein said brine is at a temperature of from about 50 to about 75° C.

12. The process of claim 2 wherein said brine is at a temperature of from about 25 to about 80° C.

13. The process of claim 2 wherein said brine is at a temperature of about 25 to about 80° C. and said solvent is a linear alkyl benzene or mixture of linear alkyl benzene compounds having from about 6 to about 14 carbon atoms in the alkyl chain.

14. The process of claim 3 wherein said brine is at a temperature of from about 25 to about 80° C. and said solvent is a mixture of linear alkyl benzene compounds having one alkyl group attached to each benzene ring, said alkyl group averaging from about 10 to about 12 carbon atoms.

* * * * *